Dec. 8, 1953  J. B. FAIRBANKS  2,661,672
TRIPOD MECHANISM

Filed June 15, 1950  2 Sheets-Sheet 1

JERRY B. FAIRBANKS
INVENTOR.

BY
ATTORNEY

Dec. 8, 1953  J. B. FAIRBANKS  2,661,672
TRIPOD MECHANISM
Filed June 15, 1950  2 Sheets-Sheet 2
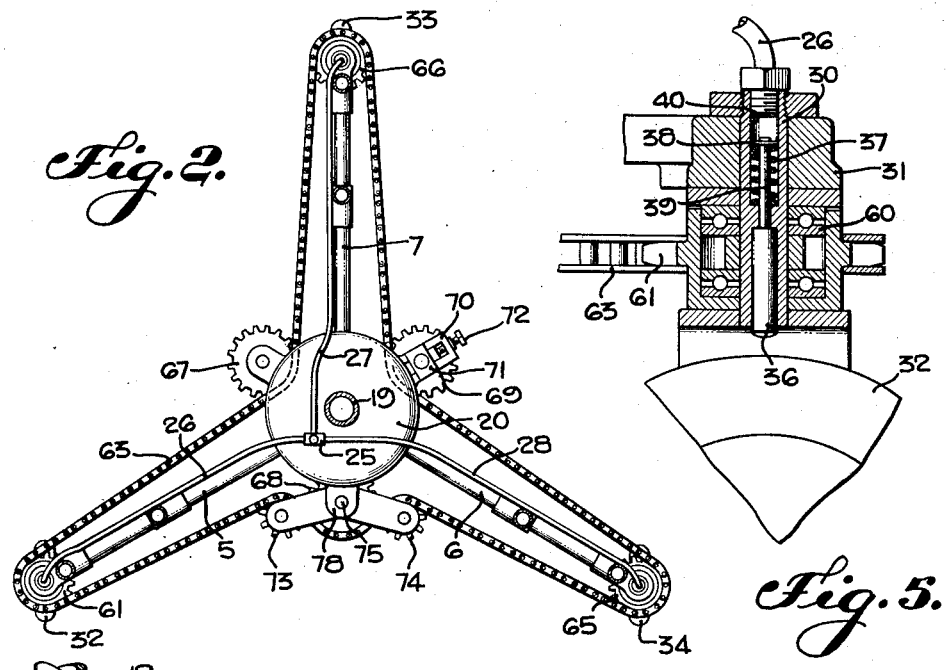
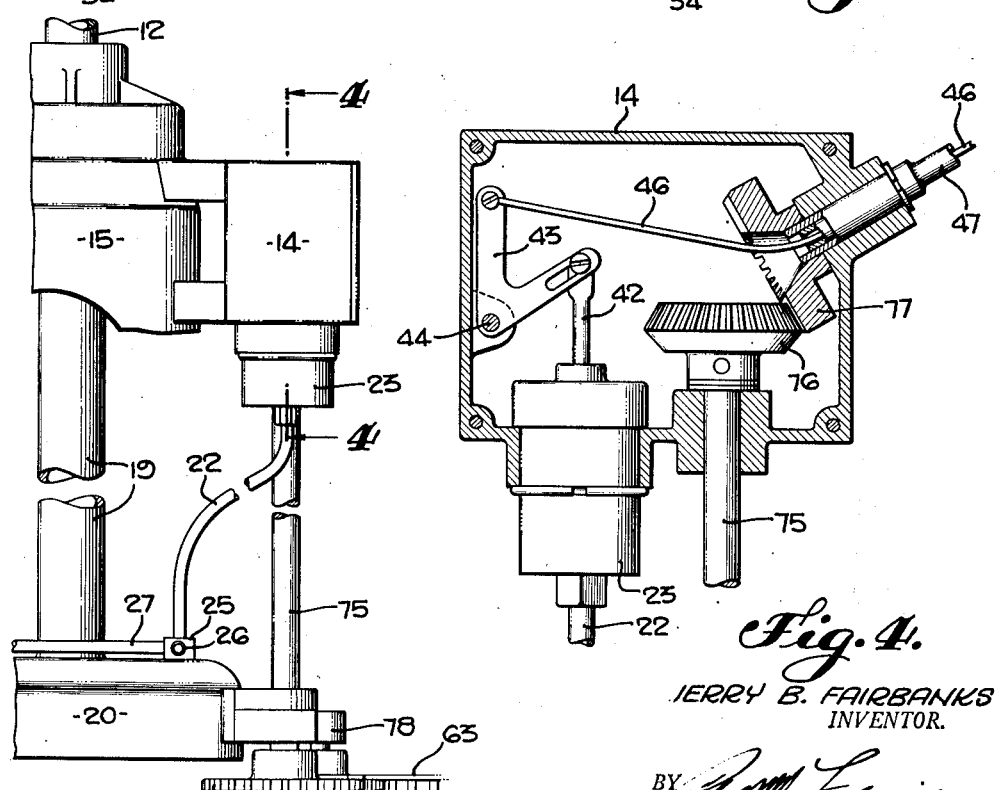
JERRY B. FAIRBANKS
INVENTOR.
BY
ATTORNEY Patented Dec. 8, 1953

2,661,672

UNITED STATES PATENT OFFICE 2,661,672

TRIPOD MECHANISM

Jerry B. Fairbanks, Los Angeles, Calif.

Application June 15, 1950, Serial No. 168,220

9 Claims. (Cl. 95—86)

This invention relates to photographic apparatus, and particularly to a tripod for supporting a photographic camera and similar equipment.

In the motion picture industry, motion picture cameras are usually mounted on conveyances such as booms and tripods, the present invention being directed to a tripod type of camera conveyance which is moved about during the photographing of a scene. In my co-pending U. S. application, Ser. No. 125,997, filed November 7, 1949, a motion picture photographing method and system is disclosed, wherein several cameras are moved either simultaneously and/or in serial order to photograph a sequence which has action continuing in several sets These tripods have caster wheels which permit their movement in any direction. It has been found, however, that when the tripod is moved forward and then reversed or moved at a slight angle, the caster wheels cause an irregular movement of the camera as the wheels shift their positions. This is undesirable, since it causes a shift in the picture being photographed during the camera movement. It has also been found that the tripod and camera have a tendency to move when they should be stationary.

The present invention, therefore, is directed to a tripod structure which permits steering of the tripod wheels from the pan handle of the camera, and also permits the braking of the wheels when the camera is to remain stationary.

The principal object of the invention, therefore, is to facilitate the movement of a camera on a tripod or similar conveyance.

Another object of the invention is to provide an improved camera supporting tripod which may be steered for movement in any desired direction.

A further object of the invention is to provide an improved tripod having a steering and braking mechanism for the wheels.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 2 is a plan view of the lower portion of the tripod taken along the line 2—2 of Fig. 1.

Fig. 3 is a sectional view of the gear box and steering drive taken along the line 3—3 of Fig. 1.

Fig. 4 is a cross-sectional view of the gear box taken along the line 4—4 of Fig. 3.

Fig. 5 is a detail view of a wheel brake taken along the line 5—5 of Fig. 1.

Figures 1, 6:
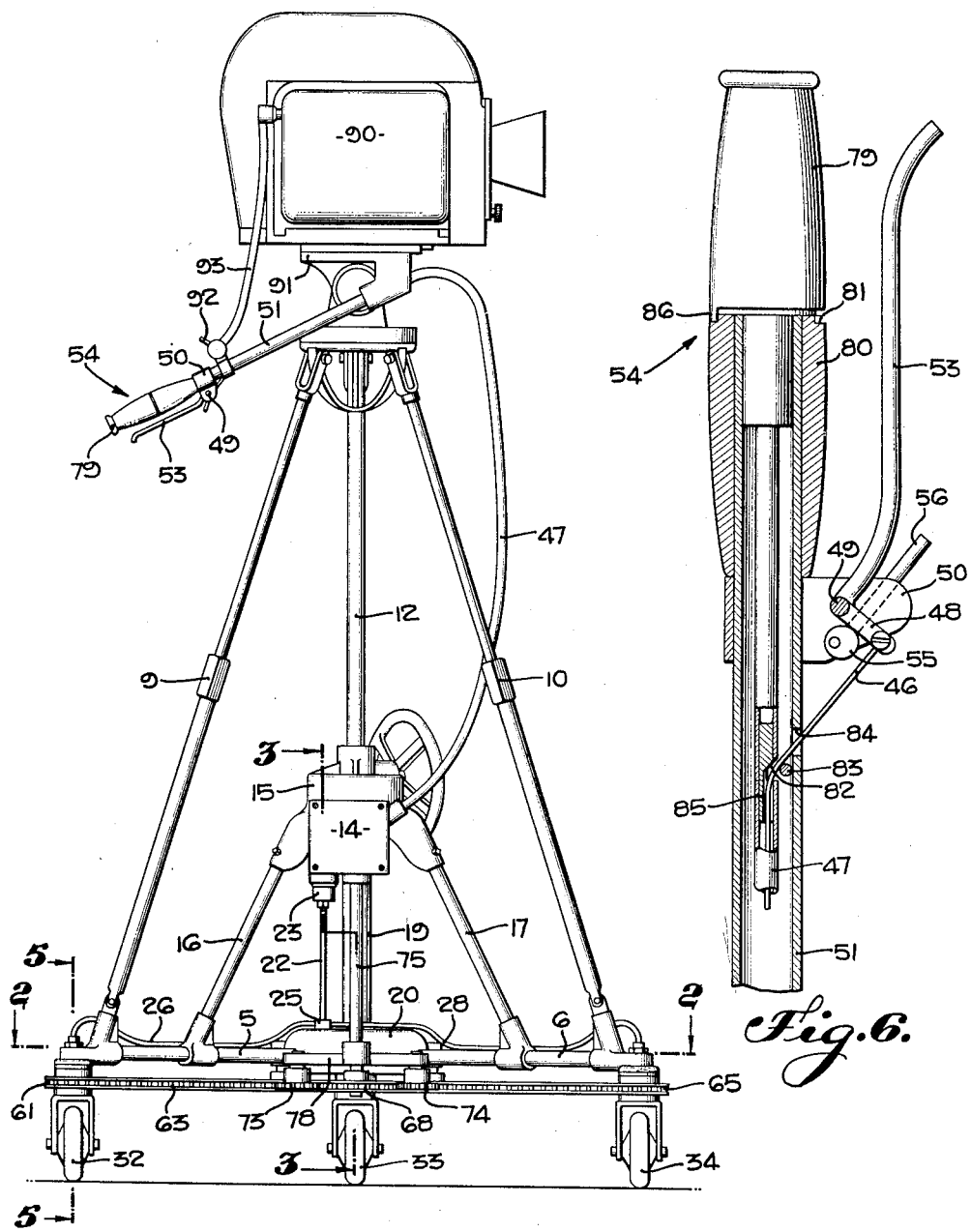
Fig. 1 is an elevational view of a tripod embodying the invention.
Fig. 6 is a detail view, partly in cross-section, of the control handle of the steering and braking mechanism.

Referring now to the drawings, in which the same numerals identify like elements, a tripod is composed of a tubular frame having lower cross members 5, 6, and 7; three vertically adjustable legs, two of which are shown at 9 and 10; and a center support 12, which telescopes in tube 19. A gear box 14 is shown attached to a center bracket 15 on tube 19 and supported by legs, two of which are shown at 16 and 17. These legs are attached near the mid points of lower cross members 5, 6, and 7. The tube 19 is mounted on a central connecting casting 20, to which cross members 5, 6, and 7 are attached.

Extending from the gear box 14 is a pipe 22 which is connected to the bottom of a cylinder 23 extending within the gear box 14. This pipe is connected at junction 25 to three pipes 26, 27, and 28, which extend to cylinder members 30 in the bearings 31 for the wheels 32, 33, and 34. Mounted in the lower end of the cylinder member 30 is a solid brake plunger or pin 36 having its upper stem 39 extending into the upper portion of the member 30. Surrounding stem 39 is a spring 37, the ends thereof bearing on the shoulder of the upper section of cylinder 30, and a piston head or washer 38 on the stem 39. Thus, pressure on the head 38 will cause the brake pin 36 to move downwardly and contact the rim of the wheel 32 and apply a braking action thereto. Since all three wheels are similarly constructed, the braking action will be applied to all wheels simultaneously.

To obtain the hydraulic pressure required to move pins 36 into contact with the wheels, a piston rod 42 moves a piston downwardly in cylinder 23. The rod 42 is connected to a crank bracket 43 pivoted at 44 on a boss of the gear box 14. The other end of bracket 43 is connected to the end of pull wire 46, which passes through the center of a shaft conduit 47 to the end of a lever 48 pivoted at 49 on a bracket 50 mounted on the pan rod 51. Hand lever 53 is connected to the lever 48 at pivot point 49, so that when the lever 53 is moved toward the handle 54, a pulling action on the flexible wire 46 will be effected which will apply the brakes as above described. When the brakes have been applied, a cam 55, attached to a handle 56, may be rotated to hold the handle 53 locked in braking position.

Referring now to the steering mechanism, each wheel has its vertical steering axis passing perpendicularly through its rotational axis, and each wheel bearing, as shown at 60, has mounted thereon a sprocket wheel 61. A chain 63 passes around each of the sprocket wheels 61, 65, and 66, and is held in position by sprocket wheels 67, 68, and 69. Sprocket 67 is an idler and is mounted on a stub shaft from a bracket on the center casing 20. The sprocket 69 is mounted in a U-shaped extension 70 from casting 20 and carries the bearing 71 of the sprocket, which is adjustable toward and away from the axis of the tripod by screw 72 for the purpose of tightening the chain 63. The sprockets 68 is the drive sprocket and is connected by shaft 75 to a beveled gear 76 within the gear box 14. It will be noted that the chain 63 passes over the outer portion of the sprocket 68 guided by idlers 73 and 74 mounted on T bracket 78 extending from casting 20. In this manner, the wheels are turned to the right when the steering handle is turned to the right, and vice versa.

The beveled gear 76 meshes with a similar gear 77 attached to the flexible, rotatable conduit shaft 47, which, in turn, is connected to the rotatable outer end section 79 of the handle 54, the inner section 80 of the handle being stationary. The pull rod 46 enters the flexible conduit shaft 47 in a notch provided at 82 and passes over a roller 83 and out a notch 84 in the pan handle 51. The circumferential extension of the notch 82 is 180 degrees, which is all the rotation required of the tripod wheels, the shaft being reinforced in the slot by an insert 85. To limit the rotation, the rim of fixed handle portion 80 is notched over 180 degrees at 81 and an extension 86 of portion 79 is fitted therein.

Thus, the camera 90, which may be of any standard make, mounted on the universal tripod head 91, may be manipulated by the pan handle 54 either in a vertical plane or in a horizontal plane. Also, the handle 54 permits the operator to steer the wheels 32, 33, and 34 of the tripod, and, by lever 53, to apply a brake to the wheels. For instance, should the action call for movement of the tripod forward and then later for a transverse movement 90 degrees from the forward movement, the operator would align the wheels 90 degrees to the position shown in Fig. 1 and move the camera to the right. At that point, he would turn the handle portion 79 aligning the wheels as shown in Fig. 1, and the camera could then be moved toward the right or left 90 degrees. At any time that the camera is stopped, the brake handle 53 may be set. Since the steering axes of the wheels 32, 33, and 34 intersect the respective rotational axes of the wheels, the steering of the wheels will not move the camera. In this manner, the operator can always change his direction of movement of the tripod and camera smoothly and uniformly and brake the tripod. All this may be done while the operator is viewing the scene being photographed in the camera view finder. The camera motor switch is shown at 92 at the end of conduit 93 mounted on the pan rod 51 near handle 54.

By having the tires of the wheels rounded, the wheels will be turned on substantial point contacts with floor. This makes turning easy and does not shift the tripod during turning. Regular hydraulic brake fluid is used in the cylinder 23 and brake system. By making the bearings 60 so that they may be locked or unlocked from the wheels 32, 33, and 34, the wheels may be made free-wheeling. Pins through the bearing castings 31 into the bearings 60 or the members 30 will provide selective steering of one or more of the wheels.

I claim:

1. A tripod mechanism comprising: a framework; a plurality of wheels supporting said framework; means for simultaneously rotating all of said wheels, said means including a shaft bearing having a vertical axis for each of said wheels, a sprocket on each of said bearings, a chain interconnecting said sprockets, a drive sprocket, a rotatable handle, a flexible shaft connected to said handle, and gears connecting said flexible shaft to said drive sprocket; brake elements mounted on said framework and positioned adjacent each of said wheels, operable to hold said wheels against rolling, and means associated with said handle and extending therefrom to said brake elements and manually operable to actuate said brake elements to hold said wheels against rolling.

2. A tripod mechanism comprising: a framework; a plurality of wheels supporting said framework; means for simultaneously rotating all of said wheels, said means including a shaft bearing having a vertical axis for each of said wheels, a sprocket on each of said bearings, a chain interconnecting said sprockets, a drive sprocket, a rotatable handle, a flexible shaft connected to said handle, and gears connecting said flexible shaft to said drive sprocket; brake elements mounted on said framework and positioned adjacent each of said wheels; and means connected to said rotatable handle, operable independently of the rotation of said handle, for applying said brake elements to said wheels, said means including a pull wire within said flexible shaft and having a manipulable member adjacent said handle, a hydraulic cylinder mounted on said framework and operated by said wire, and hydraulic pipe connections between said cylinder and said brake elements.

3. A tripod support for a camera or similar article of the class described which includes: a framework; a plurality of wheels supporting said framework; means connecting at least one of said wheels to said framework for rotation about an axis generally perpendicular to the plane of the surface on which said wheel is adapted to roll, thereby providing a steerable wheel; steering means connected to said steerable wheel and operable to turn said wheel about said perpendicular axis; a pivotable member connected to said framework for receiving an article such as a camera; a handle connected to said pivotable member and projecting outwardly therefrom, said handle being movable with said pivotable member to control the position thereof, and said handle also being rotatable about its longitudinal axis; and means interconnecting said handle and said steering means, said interconnecting means acting to transfer the rotation of said handle about its longitudinal axis to said steering means for controlling the position of said steerable wheel.

4. A tripod support for a camera or similar article of the class described which includes: a framework; three wheel assemblies supporting said framework; means connecting at least one of said wheel assemblies to said framework for rotation about an axis generally perpendicular to the plane of the surface on which said wheel assembly is adapted to roll, thereby providing a steerable wheel assembly; steering means connected to said steerable wheel assembly and operable to turn said wheel assembly about said perpendicular axis; a pivotable member connected to said framework for receiving an article such as a camera; a handle connected to said pivotable member and projecting outwardly therefrom, said handle being movable with said pivotable member to control the position thereof, and said handle also being rotatable about its longitudinal axis; and flexible drive means interconnecting said handle and said steering means, acting to transfer the rotation of said handle about its longitudinal axis to said steering means for controlling the position of said steerable wheel.

5. A tripod support as described in claim 4, further characterized by the provision of interlocking means connecting each of said wheel assemblies to said steerable wheel assembly, each of said wheel assemblies being rotatable about its own axis perpendicular to the plane of the surface on which it is adapted to roll, said interlocking means acting to maintain all of said wheel assemblies parallel to each other.

6. A tripod support as described in claim 4, further characterized by the provision of braking means acting on at least one of said wheel assemblies to prevent the rolling thereof, said braking means including a lever pivotally connected to said handle, friction means engageable with a rolling portion of said wheel assembly, and flexible power-transmitting means extending between said lever and said friction means and acting to force said friction means into engagement with said rolling portion of said wheel assembly upon pivotal movement of said lever with respect to said handle.

7. A tripod support as described in claim 4, characterized by the provision of interlocking means connecting each of said wheel assemblies to said steerable wheel assembly, each of said wheel assemblies being rotatable about its own axis perpendicular to the plane of the surface on which it is adapted to roll, said interlocking means acting to maintain all of said wheel assemblies parallel to each other, and further characterized by the provision of braking means acting on at least one of said wheel assemblies to prevent the rolling thereof, said braking means including a lever pivotally connected to said handle, friction means engageable with a rolling portion of said wheel assembly, and flexible power-transmitting means extending between said lever and said friction means and acting to force said friction means into engagement with said rolling portion of said wheel assembly upon pivotal movement of said lever with respect to said handle.

8. A tripod steering mechanism comprising: a frame; a plurality of wheels supporting said frame; a camera mounted on said frame for pivotal movement with respect thereto; a handle for pivotally moving said camera with respect to said frame; a shaft connected to said handle for rotation by movement of said handle about its longitudinal axis; means mounted on said frame between said wheels and said frame for turning said wheels on their respective vertical axis; means interconnecting said last-mentioned means; and gears between said rotatable shaft and said interconnecting means, rotation of said shaft rotating said gears and said wheels.

9. A tripod steering mechanism comprising: a frame; a plurality of wheels supporting said frame; means for mounting a camera on said frame for pivotal movement with respect thereto; a handle for pivotally moving said camera mounting means with respect to said frame; a shaft connected to said handle for rotation by movement of said handle about its longitudinal axis; means mounted on said frame between said wheels and said frame for turning said wheels on their respective vertical axis; means interconnecting said last-mentioned means; gears between said rotatable shaft and said interconnecting means, rotation of said shaft rotating said gears and said wheels; brake pins in said means mounted on said frame between said wheels and said frame; a pull wire within said rotatable shaft and having a manipulable member adjacent said handle; and hydraulic connections between said wire and said pins whereby operation of said manipulable member causes longitudinal movement of said wire to apply said pins to said wheels.

JERRY B. FAIRBANKS.

References Cited in the file of this patent

UNITED STATES PATENTS

| Number | Name | Date |
| --- | --- | --- |
| 2,200,736 | Bedford | May 14, 1940 |
| 2,235,044 | Ronning | Mar. 18, 1941 |
| 2,388,692 | House | Nov. 13, 1945 |
| 2,468,801 | Beall | May 3, 1949 |
| 2,472,442 | Schueler | June 7, 1949 |

FOREIGN PATENTS

| Number | Country | Date |
| --- | --- | --- |
| 45,032 | Germany | Nov. 25, 1910 |